Patented Aug. 22, 1944

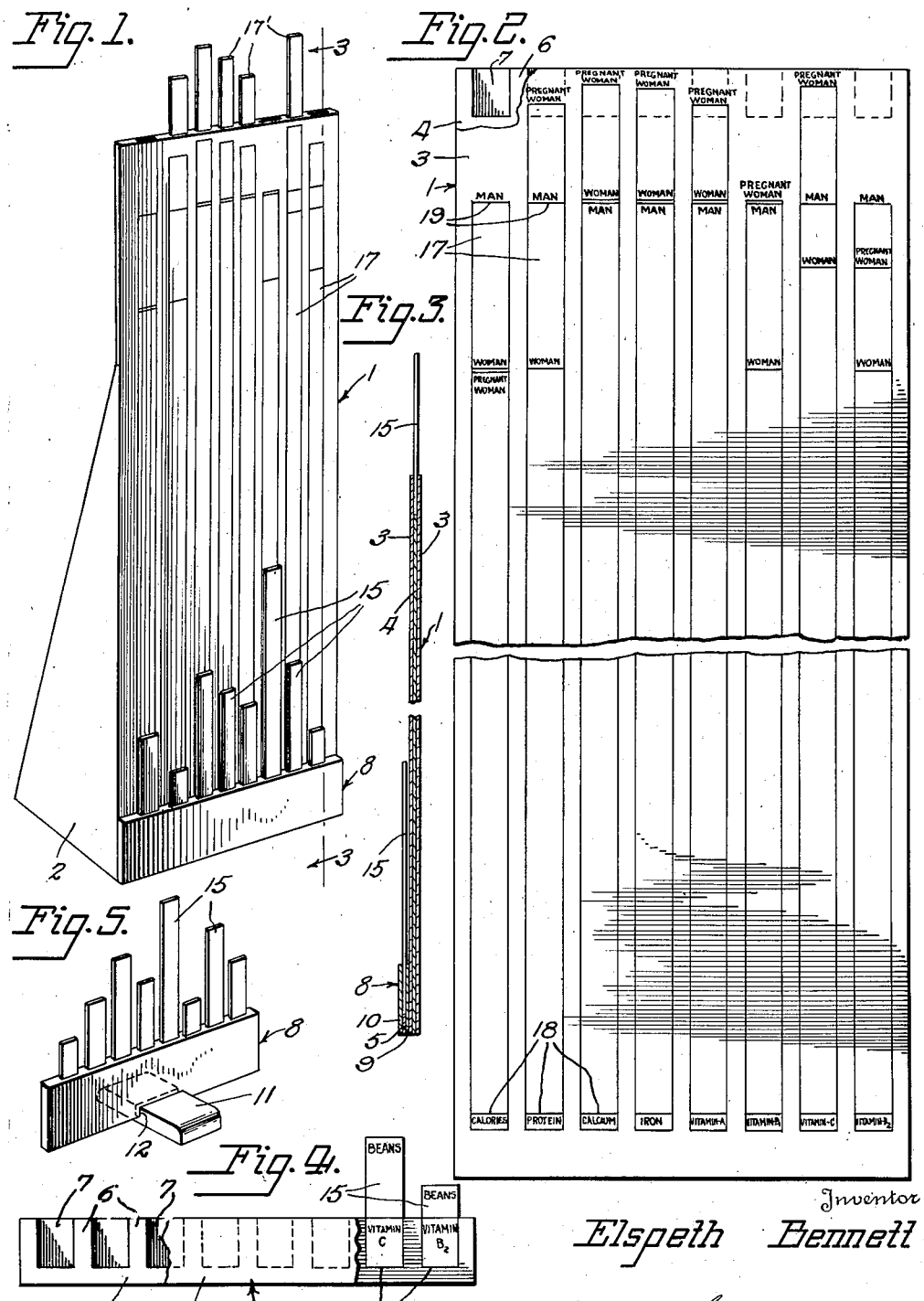

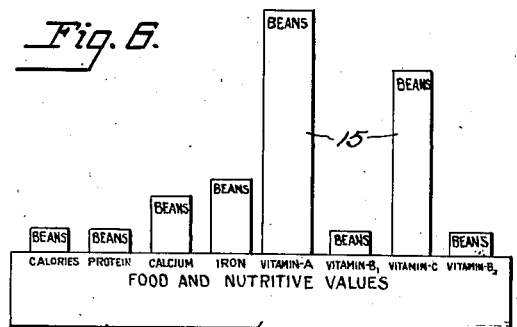
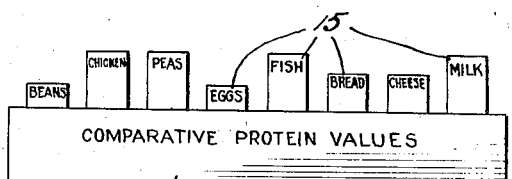
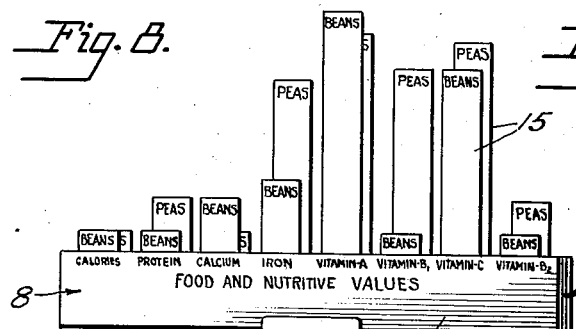
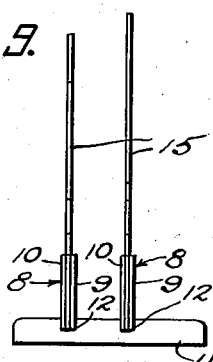
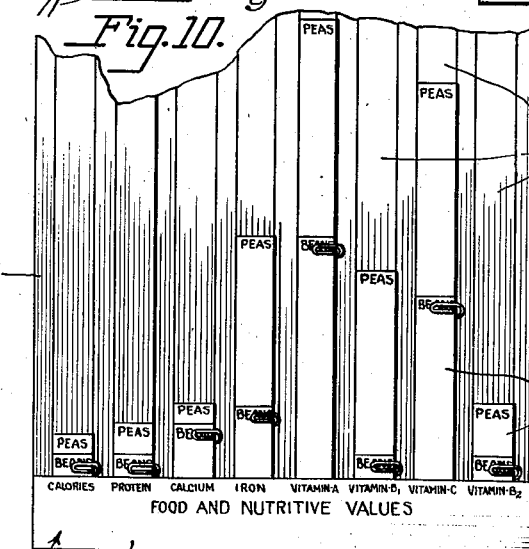
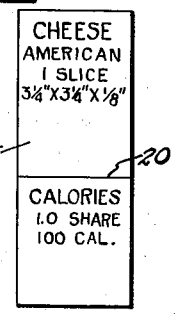

2,356,561

UNITED STATES PATENT OFFICE 2,356,561

EDUCATIONAL DEVICE FOR DEMONSTRATING NUTRITIONAL FOOD AND FOOD INGREDIENT COMPARISONS

Elspeth Bennett, Syracuse, N. Y.

Application July 29, 1943, Serial No. 496,632

9 Claims. (Cl. 35—1)

This invention relates to educational devices and more particularly to an educational device by means of which data of an abstract character can be graphically displayed in such a manner as to impress the eye and memory and thus permit the student to visualize definite relative values so that same will impress themselves on the memory.

The apparatus which will be hereinafter more particularly described in detail is peculiarly adapted for use in connection with the study of foods with relationship to the various nutritive values of the contents of particular foods, the relative nutritive values of different foods, and the combined nutritive values of combinations of foods in connection with standard diets determined by the sex, age and conditions of the particular persons under consideration.

Scientific research in the chemical analysis of various standard foods make available considerable data which is available to students and teachers in the form of tables, but the comparison of such tables of numerical values requires great concentration and the figures commonly expressed in decimal fractions do not readily impress themselves upon the mind, particularly in their comparative or relative values.

The object of the present invention, therefore, is to provide apparatus by which such data is transformed into proportional sized objects which can be associated in a most effective and impressive manner with a standardized display board so as to permit the graphic representation of such relative values.

The invention consists in the novel arrangement and combinations of parts as hereinafter more particularly described and claimed.

Two sheets of drawings accompany this specification as part thereof, in which like reference characters indicate like parts throughout.

In the drawings:

Figure 1 is a perspective view of the improved display board showing a plurality of data shafts positioned with relation thereto.

Figure 2 is a front view of the display board illustrating details of construction.

Figure 3 is a vertical cross-section taken on line 3—3 of Figure 1.

Figure 4 is a plan view of a data shaft holder partly broken away to indicate its construction with data shafts in position.

Figure 5 is a perspective view of a shaft holder with data shafts in position, all held by a supporting block.

Figure 6 illustrates a shaft holder with data shafts arranged therein illustrating the constituent nutritive values in the single food item beans.

Figure 7 illustrates a shaft holder with assembled data shafts illustrating the comparative value of a variety of standard foods with respect to a single constituent ingredient common to each.

Figure 8 illustrates the arrangement of two shaft holders in a supporting block 11 so disposed as to graphically illustrate the relative food values of two common foods, peas and beans, with respect to the constituent food elements found in each.

Figure 9 is an end view of the arrangement illustrated in Figure 8.

Figure 10 is a fragmentary illustration of the lower portion of the display board illustrating the arrangement of data shafts for two common foods to be used in comparison and indicating the combined values of the common nutritive elements of each through the association of the proper data shaft by means of paper clips or the like.

Figure 11 is a fragmentary vertical cross-section illustrating a possible modification of the structure of the display board.

Figure 12 is a plan view of a single data shaft illustrating the positioning of the datum line separating it into the supporting part and the accurately proportioned part.

In accordance with the present invention, certain relatively simple structural elements are provided by means of which a variety of important comparative problems can be graphically displayed and these structural elements comprise a display board 1 formed of sheet material which may be of cardboard, plastics, or any other suitable material, data shafts 15 which also may be formed of any suitable sheet material, data shaft holders 8 and supporting blocks 11.

The display board 1 is preferably of rectangular shape and formed from three sheets of material arranged in face to face contact. The innermost sheet 4 is provided adjacent to its upper edge with a plurality of notched-out parts 7 so that this sheet in association with the front and rear sheets 3—3 will form adjacent the top a plurality of spaced pockets 7 opening upwardly for the purpose of receiving strips 17'. On the face of the display board is marked a plurality of vertically extending horizontally spaced columns 17 herein illustrated as eight in number, corresponding to the eight essential food elements required for the human diet, to wit, calories, protein, calcium, iron, vitamin A, vitamin B₁, vitamin C and vitamine B₂. On each of these columns is marked the standardized daily amount of its particular ingredient required by a man, a woman, a pregnant woman and, if desired, similar data with respect to different age groups, so that each vertical column will in itself display the relative daily amount of the particular food value represented by that column for the various groups of users.

For convenience, the daily requirement of the various food ingredients required by a man is accepted for the standard column length and variations above or below that for other classes are indicated or can be added by strips 17' inserted in proper pockets 7. Thus, for example, the calcium daily required by a pregnant woman is so greatly in excess of that required by a man that the calcium column would be augmented by a supplemental strip properly proportioned. The bottoms of all the vertical columns 17 are in a common horizontal line 18 spaced from the bottom of the display board the height of shaft holders 8.

A possible modification of the board structure is illustrated in Fig. 11, in which a notched sheet or comb 5 similar to the notched upper end of the medial sheet 4 is superposed over the face of the front sheet 3, with an additional short sheet 10 corresponding to the front sheet of a shaft holder as hereinafter described. For convenience, side wings 2 will be hingedly connected to the display board 1 so as to support the board for display purposes.

A plurality of data shaft holders 8 are provided also, preferably constructed from sheet material and comprising front and rear portions 9 and 10 and a medial notched comb part 5 provided with a plurality of notches 7 and intermediate fingers 6 constituting upwardly opening pockets adapted to receive the data shafts 15 to support same vertically and in spaced alignment corresponding with the spaced alignment of the vertical columns 17 marked on the face of the display board 1.

These shaft holders are constructed of such height that their upper edge will coincide with the bottom lines of the vertical columns 17 when they stand in front of the display board and rest on the same base. On one face each pocket is marked with a particular nutrient corresponding in order with the arrangement of said nutrient data column on the display board. On the opposite face each shaft holder displays the name of one nutrient but carries no indicia on the pockets. this face being utilized conveniently for assembling for comparison a particular nutrient constituent from a variety of foods.

The data shafts are rectangular strips of sheet material of cardboard, plastics, or the like, corresponding in width with the vertical data columns on the board 1, and these data strips are provided in groups, one for each ingredient of each of the standard foods. Each data shaft is provided with a transverse datum line 20 spaced from its bottom edge, the depth of the pockets 7 provided in the shaft holders 8 or in the display board 1 as previously described and the length of the data shaft above this datum line is accurately proportioned in length to the established share value, a unit of the particular ingredient of the particular food represented by that data shaft relative to the daily requirement of that ingredient. Thus for each of the standard foods such as cheese, beans, peas and the like, there will be data shafts, each proportioned in length with respect to its datum line to represent the share value in calories, protein, calcium, iron, vitamin A, vitamin B₁, vitamin C and vitamin B₂ for a unit of each of said goods.

For the convenient support for demonstration purposes apart from the display board of the shaft holders 8, support blocks 11 of wood or any suitable material are provided, such supporting blocks 11 being provided with transverse grooves 12, which grooves may be formed in parallel spaced relationship in such number as desired. Such blocks will not be used when the shaft holders are used in conjunction with the display board as they elevate the upper edge of the shaft holders.

To further enhance the graphic effect of the data shafts, it is preferred that all of the shafts be colored distinctively according to the food ingredient represented. It is further desirable that each data shaft be marked near its top with the name of the food which it represents and near the datum line with the nutrient ingredient, expressed in calories or weights or in "shares."

Thus by way of illustration the data shafts for fresh shelled peas would indicate the share and absolute values of the nutients found in a given unit taken as ½ cup as follows: calories .65 share, 65 cad.; protein 1.9 shares, 4.5 gms.; calcium .6 share, .015 gm.; iron 3.5 shares, 1.38 mgs.; vitamin A 4.6 shares, 767 I. U.; thiamin (vitamin B₁) 4 shares, .248 mg.; ascorbic acid (vitamin C) 5 shares, 13 mgs.; riboflavin (vitamin B₂ or G) 1.4 shares, 13 mg.

With apparatus such as described to study the nutritive values of a food, the data shafts of the nutritive share values of a particular food such as beans will be arranged in a shaft holder 8 as illustrated in Figure 6.

To illustrate the proportions of nutritive values which would be contributed by this food item beans in proportion to the standardized daily diet of a man, woman or other particular person, such shaft holder with assembled data shafts could be stood in front of the display board 1 with the respective data shafts superposed on the vertical columns 17, as illustrated in Figure 1.

To study the comparative nutritive values of a variety of foods, the data shafts for one particular nutrient such as protein could be arranged in a data shaft holder as illustrated in Figure 7.

To study the comparative values in particular nutritive values of two foods, the particular nutrient data shafts for the two foods could be arranged in two shaft holders and supported in a block 11 so that the data shafts assembled in one shaft holder would be slightly off-set with respect to the data shafts in the other shaft holder, thus displaying all of the data shafts as illustrated in the two arrangements shown in Figures 8 and 9.

A further study of combinations of foods proposed to be used to establish a balanced diet is possible with the use of the data shafts in conjunction with the display board, as illustrated in Figure 10, in which the nutrient value data shafts for peas and beans are shown associated one above the other by means of paper clips 16 and obviously additional data shafts for other foods can be added vertically in each column until the standard daily dietary requirement of the particular person, man, woman, or child of specific age indicated in the vertical column 17 is substantially reached. Thus on the display board can be graphically illustrated a plurality of available food combinations, each of which will provide the desired quantity of food values.

So also the combined values of any one nutrient in a combination of foods may be observed by inserting in a shaft holder the shafts representing that nutrient for each food in the combination. Similarly the combined values in any one nutrient for different combinations of food can be graphically illustrated. Various food combinations can be arranged and compared by use of the support blocks.

With the display board and shaft holders only, it can be determined to what extent one nutrient in a food or in each of several foods meets the needs of different persons for that nutrient or to what extent any one nutrient in a combination of foods meets the needs of different persons for that nutrient.

Similarly the comparative nutritive valeus of different complete menus can be visualized and compared.

Other combinations and arrangementse of the data shafts will suggest themselves to those skilled in the art, all tending to the effective and graphic comprehension of data otherwise difficult to visualize and appreciate.

Having thus fully described my invention, I claim:

1. An educational device comprising a display board having a plurality of horizontally spaced, vertically extending columns, each adapted by one dimension to reproesent data, a plurality of shafts each adapted by one dimension to represent data, said shafts each corresponding in another dimension with the columns of the board and shaft holders for associating and supporting a plurality of the shafts to register with the columns of the board.

2. An educational device comprising a display board having a plurality of horizontally spaced, vertically extending columns, each adapted by their length to represent data, a plurality of shafts each adapted by their length to represent data, said shafts each corresponding in width with the columns of the board and shaft holders for associating and supporting a plurality of the shafts to register with the columns of the board, with means for associating and supporting a plurality of said shaft holders adjustably with respect to each other.

3. In an educational device, a display board having a plurality of horizontally spaced, vertically extending columns, each adapted to represent data, each of predetermined height, a plurality of shafts each adapted to represent data, corresponding in width with the columns of the board and each of predetermined length proportioned to some specific column of the board, and shaft holders for associating and supporting the shafts in register with their proper board columns.

4. In an educational device comprising a display board having a plurality of horizontally spaced, vertically extending columns, each adapted to represent data, a plurality of shafts each adapted to represent data, corresponding in width with the columns of the board, and shaft holders comprising bodies provided with aligned spaced pockets, each proportioned to receive and support shafts in horizontal spaced alignment to register with the board columns.

5. In an educational device of the type indicated, a display board having a plurality of horizontally spaced, vertically extending columns, each adapted to represent data, and upwardly open pockets formed in said board adjacent the top and bottom of each of said columns, said pockets corresponding in number and width with said columns and in vertical alignment therewith, whereby supplementary strips can be associated with said columns superposed and in extension thereof as desired.

6. An educational device comprising a display board having on its face a plurality of horizontally spaced, vertically extending columns, each adapted to represent data and each representing in length the average daily requirement, for a standard group of persons, of a particular nutrient, shafts each adapted to represent data, one shaft for each of the nutrients found in a particular food, each of said shafts being proportioned in length with the length of its respective board column.

7. An educational device comprising a display board having on its face a plurality of horizontally spaced, vertically extending columns adapted to represent data, all of said columns having their bottom lines in a common horizontal line spaced a predetermined distance above and parallel with the bottom edge of the display board, each of said columns provided with horizontally aligned lines spaced vertically above the bottom lines of said columns a distance representing the average daily requirement of a particular nutrient for a particular group of persons taken as a standard, with other lines associated with each column similarly spaced the same proportional height above said bottom lines for the required daily requirement of that nutrient for other particular groups of persons in association with shafts adapted to represent data, one shaft for each of the nutrients found in a particular food, each of said shafts proportioned in length with the total length of the board column for that particular nutrient.

8. An educational device comprising a display board having on its face a plurality of horizontally spaced, vertically extending columns adapted to represent data, of equal vertical length, each representing the average daily requirement, for a standard group of persons, of a particular nutrient, with shafts adapted to represent data, one shaft for each of the nutrients found in a particular food, said shafts each having a transverse line and proportioned in length above said line with the length of their respective corresponding board column, and shaft holders, one for each of the principal nutrients representred by the board columns, each shaft holder having formed therein a plurality of upwardly opening pockets horizontally spaced and corresponding in width with said board columns to receive and support the shafts.

9. An educational device comprising a plurality of shafts adapted to represent data, each shaft having a horizontal line, said shafts proportioned in length above said line to represent the share value of a particular nutrient contained in a unit of a particular food, with a shaft holder comprising a body formed with a plurality of upwardly opening pockets, one for each of the nutrient constituents of that food, said shafts adapted to seat in respective ones of said pockets, with said lines in horizontal alignment, whereby a plurality of said holders each carrying shafts representing the nutrient contents of a particular food may be superposed for the comparative study of the selected foods.

ELSPETH BENNETT.